United States Patent
Chin et al.

(10) Patent No.: US 8,789,141 B2
(45) Date of Patent: *Jul. 22, 2014

(54) METHOD AND APPARATUS FOR PROVIDING SECURITY FOR AN INTERNET PROTOCOL SERVICE

(75) Inventors: Jae-Sun Chin, Ilelotes, TX (US); Gregory Henderson, San Antonio, TX (US); Michael Raftelis, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/481,482

(22) Filed: May 25, 2012

(65) Prior Publication Data

US 2012/0233660 A1  Sep. 13, 2012

Related U.S. Application Data

(63) Continuation of application No. 12/338,568, filed on Dec. 18, 2008, now Pat. No. 8,191,108.

(51) Int. Cl.
*H04L 29/06* (2006.01)

(52) U.S. Cl.
CPC ................................ *H04L 63/0236* (2013.01)
USPC ............................................... 726/3; 726/22

(58) Field of Classification Search
CPC . H04L 63/10; H04L 63/0236; H04L 65/1069; Y10S 379/90
USPC .............................................................. 726/3
See application file for complete search history.

(56) References Cited

U.S. PATENT DOCUMENTS

| | | | |
|---|---|---|---|
| 7,716,729 B2 | 5/2010 | Bhatia | |
| 7,725,708 B2 | 5/2010 | Wu et al. | |
| 7,804,774 B2 | 9/2010 | Yang et al. | |
| 7,849,146 B2 | 12/2010 | Choi et al. | |
| 8,191,108 B2 | 5/2012 | Chin et al. | |
| 2002/0143770 A1* | 10/2002 | Schran et al. | 707/10 |
| 2005/0097222 A1* | 5/2005 | Jiang et al. | 709/245 |
| 2006/0025140 A1* | 2/2006 | Bales et al. | 455/445 |
| 2007/0143422 A1 | 6/2007 | Cai | |
| 2007/0153813 A1* | 7/2007 | Terpstra et al. | 370/401 |
| 2008/0134329 A1 | 6/2008 | Perreault et al. | |
| 2010/0003968 A1* | 1/2010 | Cheng | 455/412.1 |

\* cited by examiner

*Primary Examiner* — Yogesh Paliwal

(57) ABSTRACT

A method and apparatus for providing security to an endpoint device are disclosed. For example, the method receives a signaling message by the endpoint device. The method processes the signaling message, if the signaling message is received from a device associated with one of one or more Internet Protocol (IP) addresses in an Access Control List (ACL), and discards the signaling message, if the signaling message is received from a device not associated with one of the one or more IP addresses in the ACL.

20 Claims, 4 Drawing Sheets

METHOD AND APPARATUS FOR PROVIDING SECURITY FOR AN INTERNET PROTOCOL SERVICE

This application is a continuation of U.S. patent application Ser. No. 12/338,568, filed Dec. 18, 2008, which is currently allowed and which is herein incorporated by reference in its entirety.

The present invention relates generally to communication networks and, more particularly, to a method and apparatus for providing security for a Voice over Internet Protocol (VoIP) service provided over an Internet Protocol (IP) based network.

BACKGROUND OF THE INVENTION

A customer may wish to access a Voice over Internet Protocol service using an endpoint device. For example, the customer may wish to use an Internet Protocol (IP) phone to initiate a call. The customer may then register the IP phone at a call control element (e.g., a server) located in the service provider's network. After the registration of the IP phone is completed, the IP phone may receive messages from any computer on the same Local Area Network (LAN). However, this capability creates a security risk for the VoIP customer. For example, an attacker may send a message for redirecting the voice packets to another device. The VoIP customer may be unaware that his/her conversations have been compromised.

SUMMARY OF THE INVENTION

In one embodiment, the present invention discloses a method and apparatus for providing security to an endpoint device. For example, the method receives a signaling message by the endpoint device. The method processes the signaling message, if the signaling message is received from a device associated with one of one or more Internet Protocol (IP) addresses in an Access Control List (ACL), and discards the signaling message, if the signaling message is received from a device not associated with one of the one or more IP addresses in the ACL.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing security for a Voice over Internet Protocol (VoIP) service provided over an Internet Protocol (IP) based network. Although the present invention is discussed below in the context of a Voice over Internet Protocol (VoIP) service provided over an Internet Protocol (IP) based network, the present invention is not so limited. Namely, the present invention can be applied to other packet network based services, e.g., multimedia services, and the like.

Figure 1:
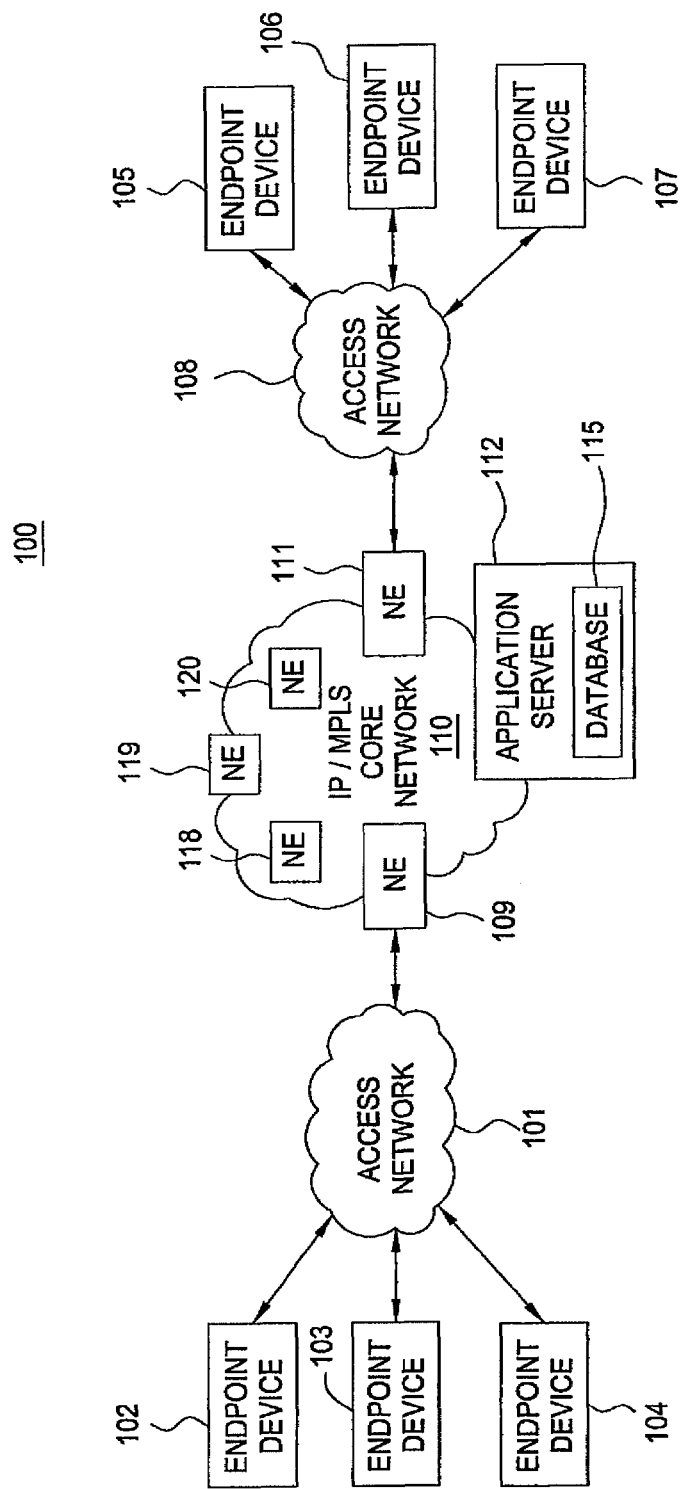
FIG. 1 illustrates an exemplary network related to the present invention.

FIG. 1 is a block diagram depicting an exemplary packet network 100 related to the current invention. Exemplary packet networks include Internet protocol (IP) networks, Ethernet networks, and the like. An IP network is broadly defined as a network that uses Internet Protocol such as IPv4 or IPv6 and the like to exchange data packets.

In one embodiment, the packet network may comprise a plurality of endpoint devices 102-104 configured for communication with the core packet network 110 (e.g., an IP based core backbone network supported by a service provider) via an access network 101. Similarly, a plurality of endpoint devices 105-107 are configured for communication with the core packet network 110 via an access network 108. The network elements (NEs) 109 and 111 may serve as gateway servers or edge routers for the network 110.

In one embodiment, the endpoint devices 102-107 may comprise IP phones. The access networks 101 and 108 serve as a means to establish a connection between the endpoint devices 102-107 and the NEs 109 and 111 of the IP/MPLS core network 110. The access networks 101 and 108 may each comprise a Digital Subscriber Line (DSL) network, a broadband cable access network, a Local Area Network (LAN), a Wireless Access Network (WAN), a $3^{rd}$ party network, and the like. The access networks 101 and 108 may be either directly connected to NEs 109 and 111 of the IP/MPLS core network 110, or indirectly through another network.

Some NEs (e.g., NEs 109 and 111) reside at the edge of the core infrastructure and interface with customer endpoints over various types of access networks. An NE that resides at the edge of a core infrastructure is typically implemented as an edge router, a media gateway, a border element, and the like. An NE may also reside within the network (e.g., NEs 118-120) and may be used as a mail server, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, and so on are depicted in FIG. 1, the communication network 100 may be expanded by including additional endpoint devices, access networks, network elements, application servers without altering the scope of the present invention.

The above IP network is described to provide an illustrative environment in which packets are transmitted on networks. To illustrate, a customer may wish to access a VoIP service using an endpoint device, e.g., an IP phone. For example, the customer may wish to originate or receive calls. The customer may then register the IP phone at a network element, e.g., a Call Control Element (CCE), located in the service provider's network. After the registration is completed, the IP phone may be used to send or receive messages. For example, the IP phone may receive a Session Initiation Protocol (SIP) message from any computing device on the same Local Area Network (LAN) that is accessed by the IP phone. However, this capability may create a security risk for the customer using the IP phone. For example, an attacker may send a SIP message intended for malicious activity to the IP phone. For example, the attacker may send a SIP message redirecting the customer's conversation to another device, e.g., a device with a microphone. The attacker may then eavesdrop on the customer without the customer being able to detect that the conversation has been compromised.

In one embodiment, the current invention provides a method for providing security for an IP service, e.g., a VoIP service. For example, the method first provides an Access Control List (ACL) to an IP phone. The ACL is used to ensure that the IP phone only transmits and receives signaling messages to and from one or more pre-configured Call Control Elements (CCEs). In one embodiment, the CCEs may comprise one or more SIP servers and/or proxy servers. That is, the SIP and/or proxy servers that an IP phone may transmit signaling messages to, or receive signaling messages from are pre-configured in the ACL within the IP phone.

Figure 2:
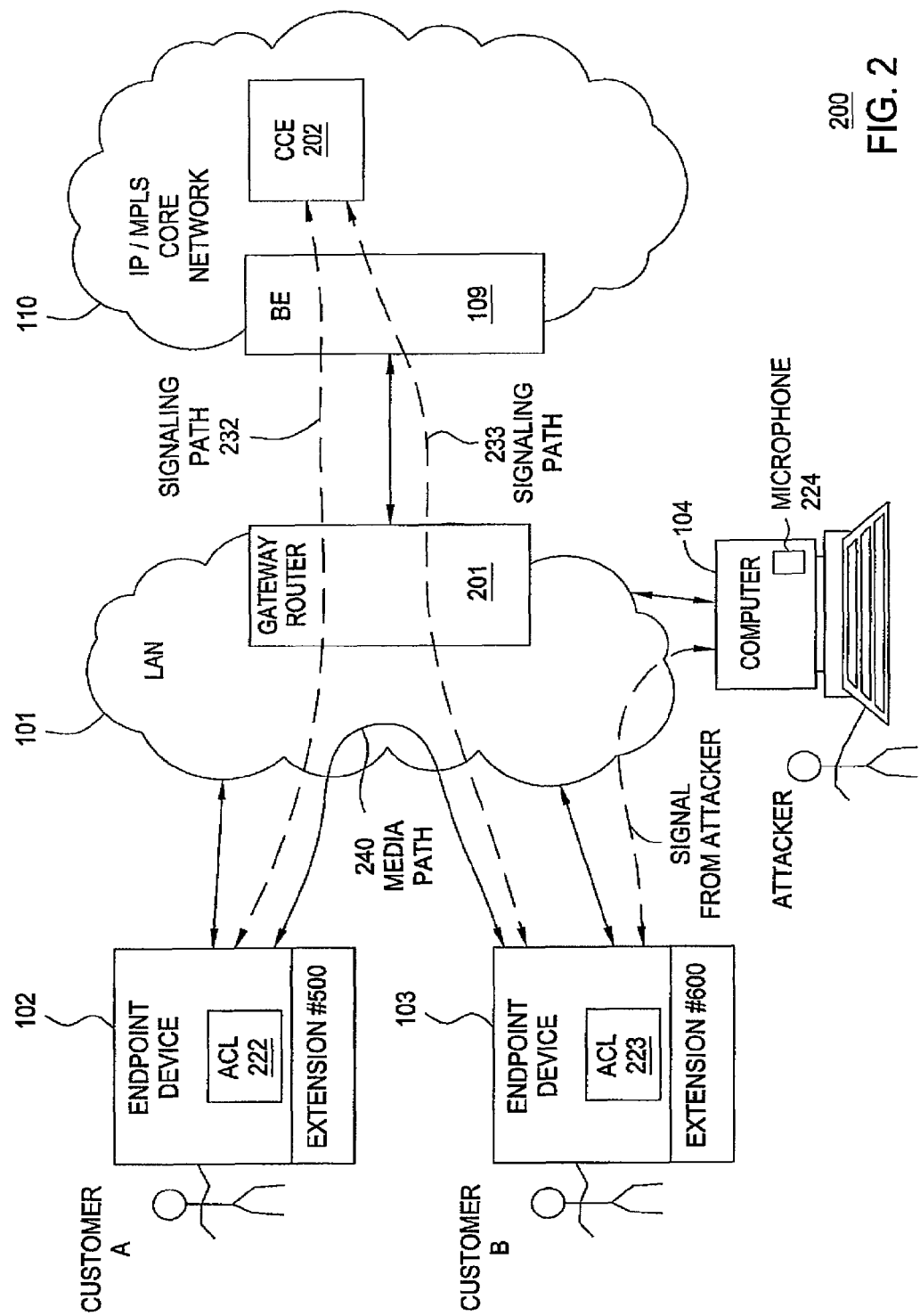
FIG. 2 illustrates an exemplary network with the current invention for providing security for a Voice over Internet Protocol (VoIP) service.

FIG. 2 illustrates an exemplary network 200 of the current invention for providing security for an IP service, e.g., a VoIP service. For example, IP phones 102 and 103 are accessing VoIP services from the IP/MPLS core network 110 through the LAN 101. The LAN 101 comprises a gateway router 201 in communication with the IP/MPLS core network 110 through a border element 109. The IP/MPLS core network 110 also comprises a call control element 202 for processing the signaling messages received from the endpoint devices, e.g., to setup a call session. The IP phones 102 and 103 comprise access control lists 222 and 223, respectively. FIG. 1 also illustrates a computer 104 with a microphone 224 that has access to the LAN 101.

In one embodiment, the method enables the users of the IP phones (e.g., customers) 102 and 103 to populate their respective access control lists 222 and 223. For example, customer A at extension number 500 may populate ACL 222 with the IP address of the CCE 202. Similarly, customer B at extension number 600 may populate ACL 223 with the IP address of the CCE 202. That is, each of the customers A and B can pre-defined his or her respective ACL to contain one or more IP addresses, e.g., the IP address of CCE 202.

It should be noted that although the above example only illustrates a single CCE, the present invention is not so limited. In other words, the IP network 110 may also comprise one or more servers, e.g., SIP servers, proxy servers and the like, that may be utilized to process signaling messages received from the endpoint devices. As such, the ACL as discussed above may also include the IP addresses of pertinent SIP servers and proxy servers.

As discussed above, the customers may access the VoIP service by registering an IP phone with the CCE 202. For example, customers A and B may register the IP phones 102 and 103 via signaling paths 232 and 233, respectively. Once registered, if a signaling message is received by the IP phones, the IP phones will then determine via the ACL whether the received signaling message originated from the CCE 202. If a signaling message is received from an IP address other than the address of the CCE 202, then the signaling message is filtered out by the IP phones. In other words, the IP phones will ignore and drop the signaling message as being from an untrusted source. However, if a signaling message is received from the CCE 202, then the message will be processed by the IP phones.

In one example, customer A originates a telephone call towards customer B using the IP phone 102. The signaling message from IP phone 102 is transmitted to the CCE 202 via the signaling path 232. For example, the signaling message may comprise a SIP-INVITE message originated by the IP phone 102 destined to the IP phone 103. CCE 202 looks at the called party information and queries the necessary VoIP service related application servers to obtain any necessary information to complete this call. For example, the CCE may determine the customer preferences and location of the IP phone 103. The CCE 202 then sends another call setup message, such as a SIP-INVITE message if SIP is used, towards the IP phone 103.

Once the call is accepted by the called party, a call acknowledgement signaling message, such as a SIP 200 OK response message, is sent in the reverse direction back to the CCE 202. After the CCE 202 receives the call acknowledgement message, it will then send a call acknowledgement signaling message, such as a SIP 200 OK response message if SIP is used, toward the calling party. In addition, the CCE 202 also provides the necessary information for establishing a media path 240. The media may then flow between IP phones 102 and 103 via the media path 240. Note that CCE 202 may not be in the media path 240.

In one illustrative scenario, an attacker with a computer, e.g., computer 104, may attempt to send a signaling message to IP phone 103. For example, the computer 104 may be used to send a SIP signaling message to redirect voice packets received from IP phone 102 towards the computer 104 having a microphone 224. In the words, the attacker is attempting to disguise the signaling message as having been sent from the CCE 202.

In one embodiment of the present invention, the IP phone 103 will be able to filter out the signaling message received from the computer 104 by using the ACL 223. Since the ACL is populated with a list of one or more IP addresses of approved or trusted devices that the IP phone is expected to interact with, the signaling message received from the computer 104 will have a source IP address that is not listed in the ACL. As such, IP phone 103 will simply discard the attacker's signaling message in accordance with the content of the ACL 223.

Figure 3:
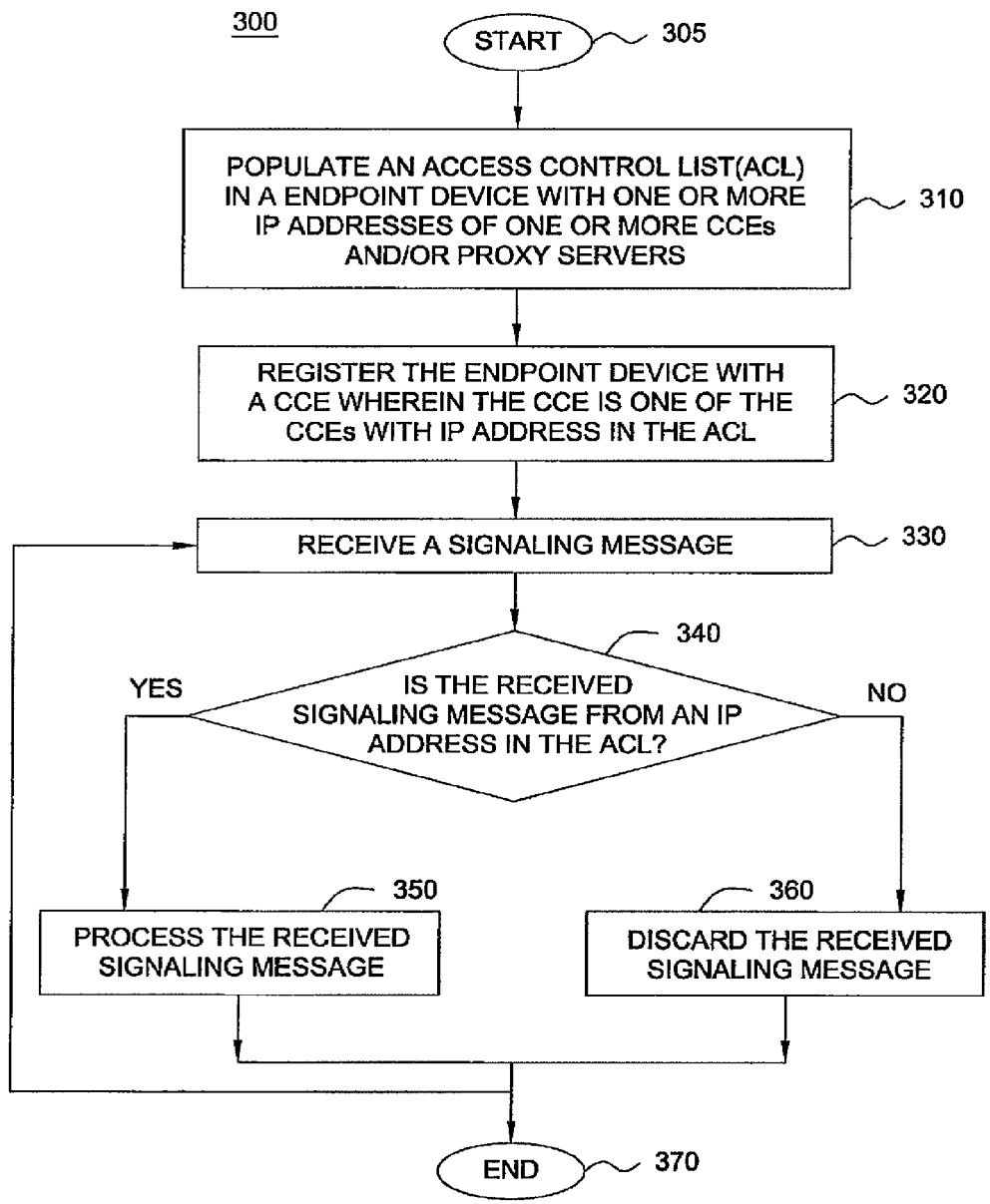
FIG. 3 illustrates a flowchart of a method for providing security for a Voice over Internet Protocol (VoIP) service.

FIG. 3 illustrates a flowchart of a method 300 for providing security for a service, e.g., a VoIP service. For example, one or more steps of method 300 can be implemented by an IP phone. Method 300 starts in step 305 and proceeds to step 310.

In step 310, method 300 populates an Access Control List (ACL) in an endpoint device with one or more Internet Protocol (IP) addresses of one or more Call Control Elements (CCEs) SIP servers, and/or proxy servers. For example, an ACL in an IP phone may be populated with an address of a CCE located in the VoIP service provider's network. It should be noted that the one or more IP addresses can be provided to the customer when the customer subscribes to services provided by a network service provider.

In step 320, method 300 registers the endpoint device with a CCE, wherein the CCE is one of the CCEs with an IP address listed in the ACL. For example, a customer may access a VoIP service by registering the endpoint device with a CCE located in the VoIP service provider's network.

In step 330, method 300 receives a signaling message. For example, the IP phone may receive a signaling message from a CCE. In another example, the IP phone may receive a signaling message from an attacker.

In step 340, method 300 determines if the received signaling message is from an IP address that is listed in the ACL. That is, the method compares each received signaling message to determine whether or not the signaling message originated from a trusted device whose IP address is populated in the ACL. If the signaling message is received from a device having an IP address listed in the ACL, then the method proceeds to step 350. Otherwise, the method proceeds to step 360.

In step 350, method 300 processes the received signaling message. For example, the method may respond to the received signaling message, e.g., by sending an acknowledgement message, e.g., SIP 200 OK message, if SIP is used. The method then ends in step 370 or returns to step 330 to continue receiving signaling messages.

In step 360, method 300 discards the received signaling message. For example, the method may filter out the received signaling message such that the message is not processed. The method then ends in step 370 or returns to step 330 to continue receiving signaling messages.

In one embodiment, the content of the ACL may be established based on network security policies established by the customer or the network service provider. For example, a network security policy may provide entries for the ACL in a customer's IP phone limiting signaling to and from one or more SIP servers.

In one embodiment, the ACL comprises a list of IP addresses of one or more SIP servers or proxy servers. For example, the service provider may have a cluster of servers functioning as CCEs. The customer may be provided with the ability to access the VoIP service from any one of the cluster of servers.

In another embodiment, the ACL comprises a list of a range of IP addresses. This approach provides flexibility to the service provider since a plurality of SIP servers or proxy servers can be associated with the range of IP addresses. As such, if one or more SIP servers or proxy servers experience a failure or congestion, another SIP server or proxy server can be substituted by assigning an IP address from the range of IP addresses. This will allow the service provider to selectively substitute one or more SIP servers or proxy servers without impacting the services provided to the customers.

For example, the VoIP service provider may have a primary call control element and a secondary call control element. In the event that the primary call control element fails, the secondary (backup) call control element may be used. Thus, it will be beneficial to include the IP addresses of both the primary and the backup call control elements in the ACL within the IP phone such that signaling from the backup call control element is accepted without reregistering the IP phone.

In one embodiment, the access control list of the current invention may be implemented in an Analog Terminal Adapter (ATA). The ATA may be used to covert analog signals to digital signals such that the digital signals are transmitted towards a VoIP network. For example, a customer may be using an analog phone attached to an ATA. When the customer initiates a call, the analog signal is converted to a digital signal and forwarded to the service provider's network. The ATA also converts the digital signals received via the service provider's network to analog signals, and then forwards the analog signal towards the analog telephone.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
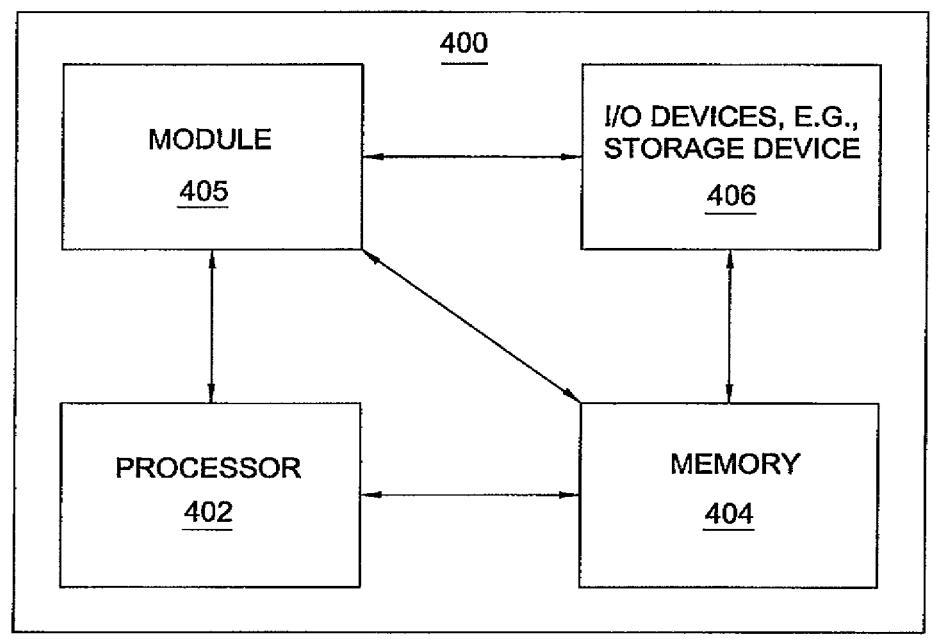
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing security for an Internet Protocol (IP) service, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing security for an Internet Protocol (IP) service can be loaded into memory 404 and executed by processor 402 to implement the functions as discussed above. As such, the present method 405 for providing security for an Internet Protocol (IP) service (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a signaling message at an endpoint device, comprising:
   receiving the signaling message by the endpoint device, wherein the endpoint device comprises an internet protocol phone;
   processing the signaling message by the endpoint device, when the signaling message is received from a network element associated with one of a group of Internet protocol addresses in an access control list, wherein the network element is a component of a telecommunication service provider network and wherein the signaling message comprises a call setup signaling message for a call to the endpoint device from an another endpoint device; and
   discarding the signaling message by the endpoint device, when the signaling message is received from a device not associated with one of the group of internet protocol addresses in the access control list.

2. The method of claim 1, wherein the signaling message comprises a session initiation protocol signaling message.

3. The method of claim 1, wherein the group of internet protocol addresses is established by a network service provider.

4. The method of claim 1, wherein the group of internet protocol addresses is associated with a plurality of call control elements, and wherein each of the plurality of call control elements comprises a session initiation protocol server.

5. The method of claim 1, wherein the group of internet protocol addresses comprises a range of internet protocol addresses.

6. The method of claim 1, wherein the endpoint device comprises a terminal adapter.

7. The method of claim 1, wherein the endpoint device comprises an analog terminal adapter.

8. The method of claim 1, wherein the group of internet protocol addresses is established by a customer.

9. The method of claim 1, wherein the group of internet protocol addresses is associated with a plurality of call control elements, and wherein each of the plurality of call control elements comprises a proxy server.

10. A non-transitory computer-readable medium storing a plurality of instructions which, when executed by a processor of an endpoint device, cause the processor to perform operations for processing a signaling message at the endpoint device, the operations comprising:
  receiving the signaling message, wherein the endpoint device comprises an internet protocol phone;
  processing the signaling message, when the signaling message is received from a network element associated with one of a group of internet protocol addresses in an access control list, wherein the network element is a component of a telecommunication service provider network and wherein the signaling message comprises a call setup signaling message for a call to the endpoint device from an another endpoint device; and
  discarding the signaling message, when the signaling message is received from a device not associated with one of the group of internet protocol addresses in the access control list.

11. The non-transitory computer-readable medium of claim 10, wherein the signaling message comprises a session initiation protocol signaling message.

12. The non-transitory computer-readable medium of claim 10, wherein the group of internet protocol addresses is established by a network service provider.

13. The non-transitory computer-readable medium of claim 10, wherein the group of internet protocol addresses is associated with a plurality of call control elements, and wherein each of the plurality of call control elements comprises a session initiation protocol server.

14. The non-transitory computer-readable medium of claim 10, wherein the group of internet protocol addresses comprises a range of internet protocol addresses.

15. The non-transitory computer-readable medium of claim 10, wherein the endpoint device comprises a terminal adapter.

16. The non-transitory computer-readable medium of claim 10, wherein the endpoint device comprises an analog terminal adapter.

17. The non-transitory computer-readable medium of claim 10, wherein the group of internet protocol addresses is established by a customer.

18. The non-transitory computer-readable medium of claim 10, wherein the group of internet protocol addresses is associated with a plurality of call control elements, and wherein each of the plurality of call control elements comprises a proxy server.

19. An apparatus for processing a signaling message, comprising:
  a hardware processor of an endpoint device comprising an internet protocol phone;
  and
  a computer-readable medium storing instructions which, when executed by the processor, cause the processor to perform operations, the operations comprising:
    receiving the signaling message; processing the signaling message, when the signaling message is received from a network element associated with one of a group of internet protocol addresses in an access control list, wherein the network element is a component of a telecommunication service provider network and wherein the signaling message comprises a call setup signaling message for a call to the endpoint device from an another endpoint device; and
    discarding the signaling message, when the signaling message is received from a device not associated with one of the group of internet protocol addresses in the access control list.

20. The apparatus of claim 19, wherein the group of internet protocol addresses is associated with a plurality of call control elements, wherein each of the plurality of call control elements comprises a session initiation protocol server.

* * * * *